G. KOMAREK.
MILLING MACHINE.
APPLICATION FILED MAY 24, 1920.
1,430,385.
Patented Sept. 26, 1922.
7 SHEETS—SHEET 1.
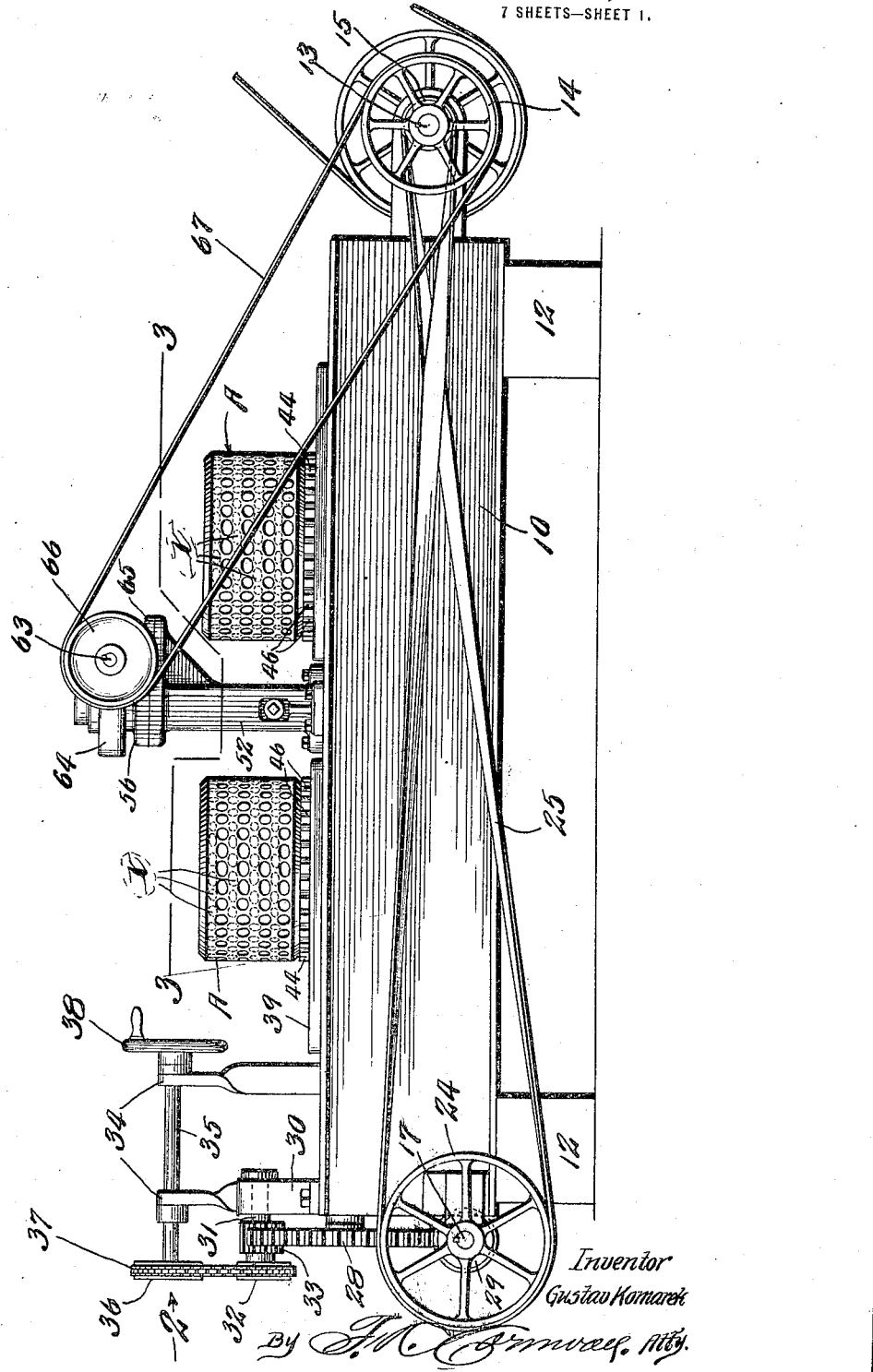
Inventor
Gustav Komarek

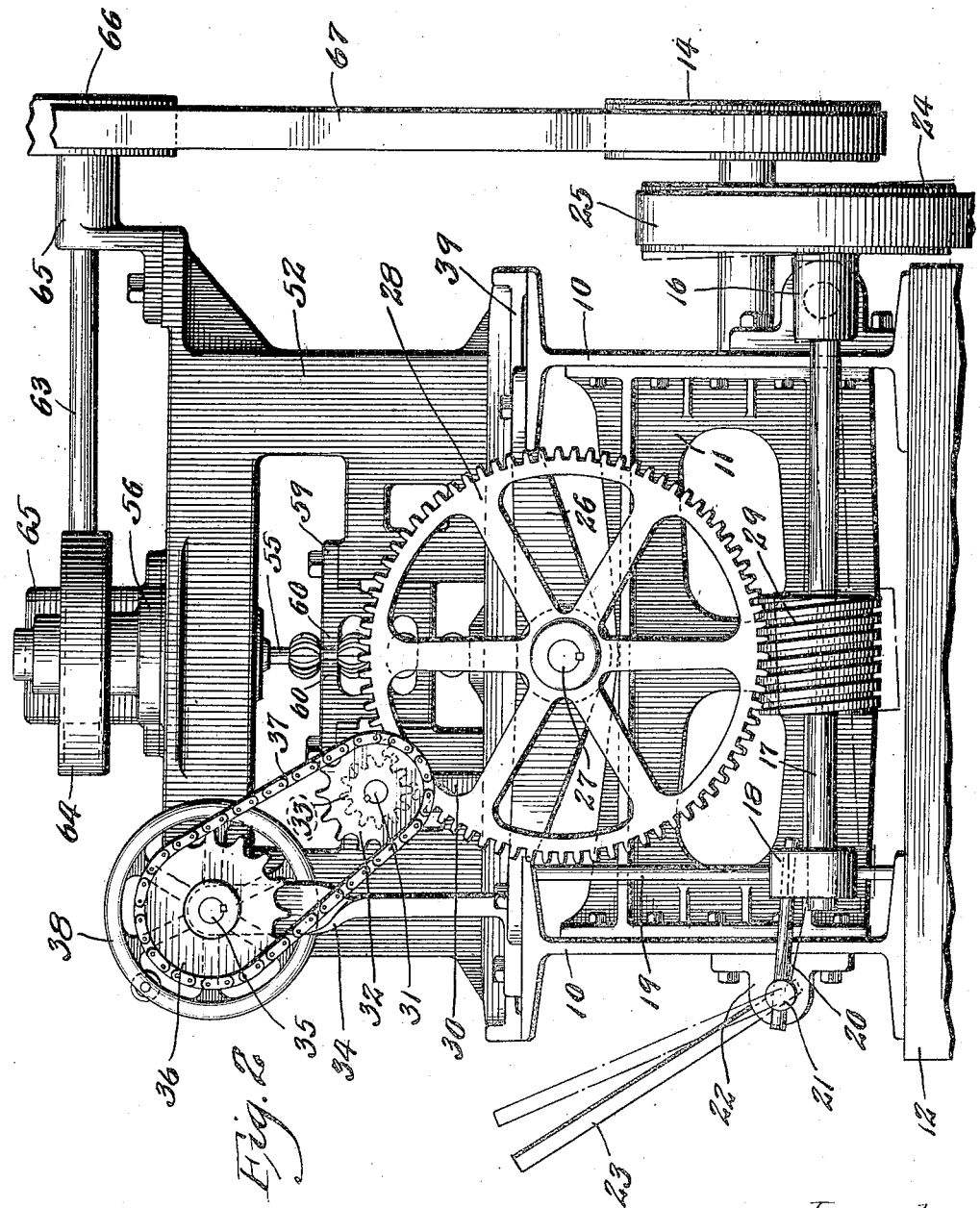

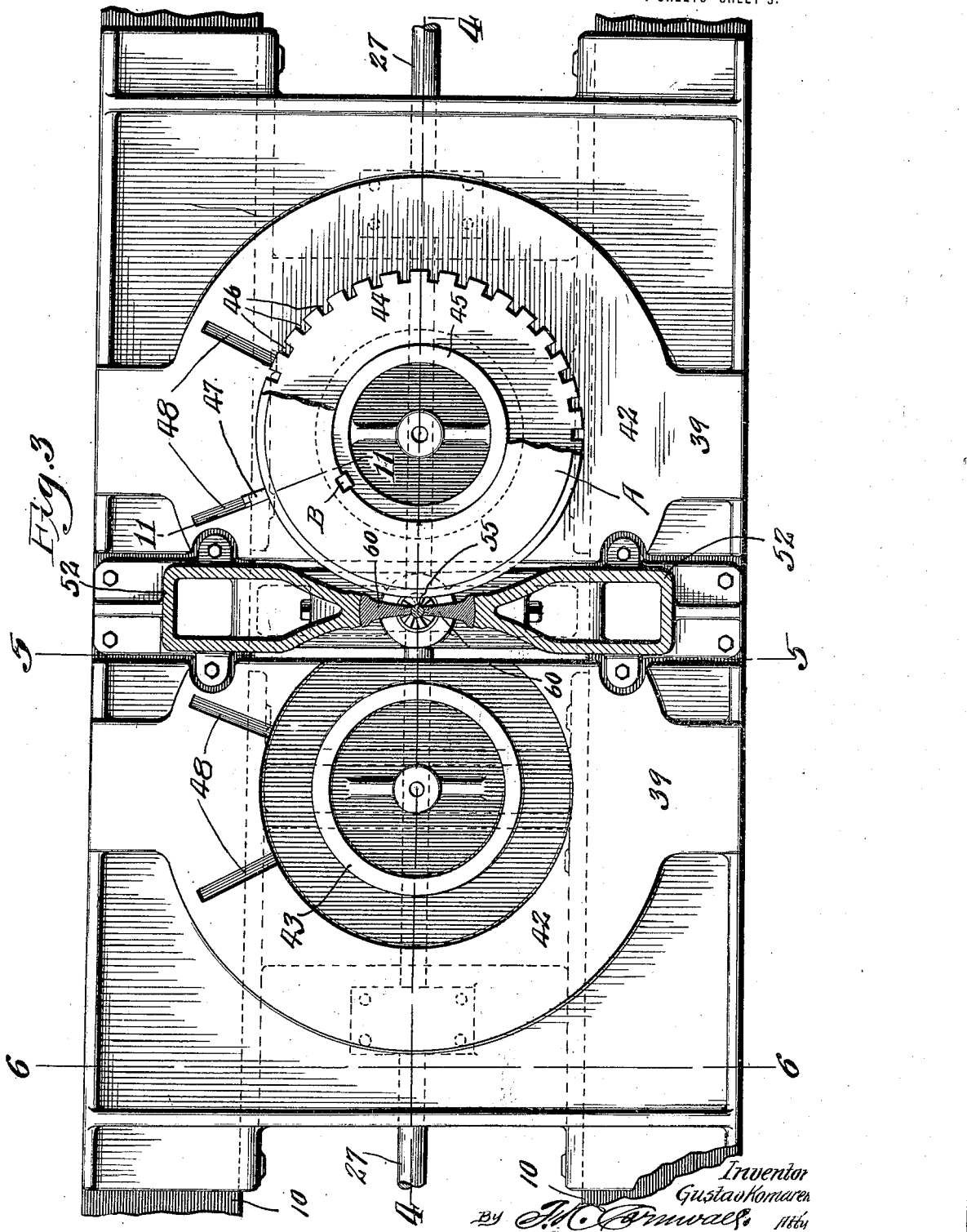

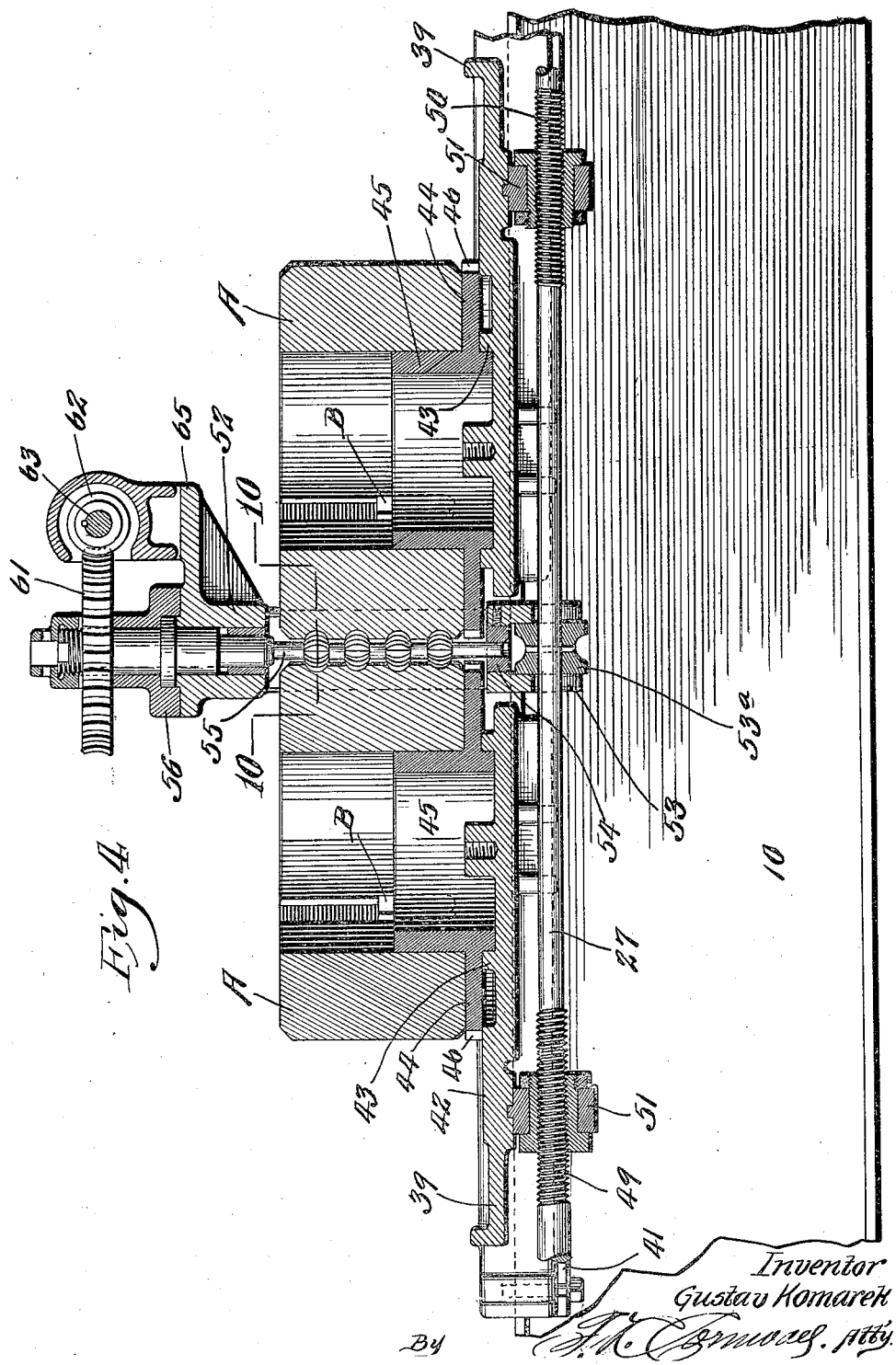

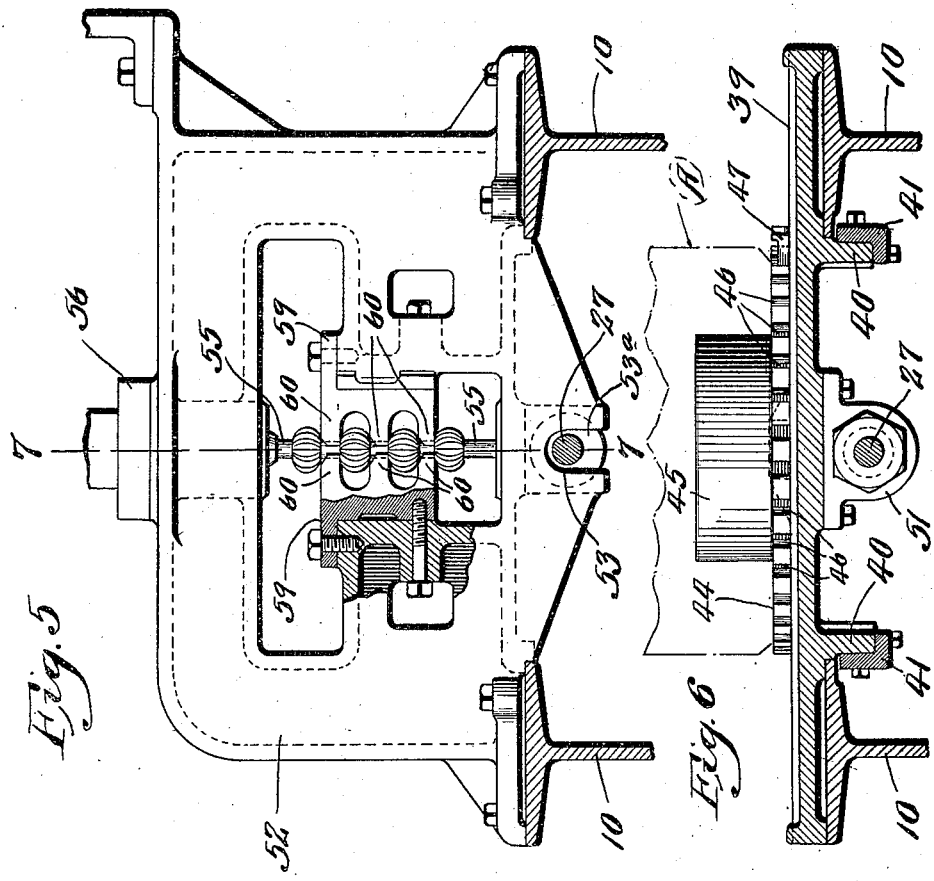

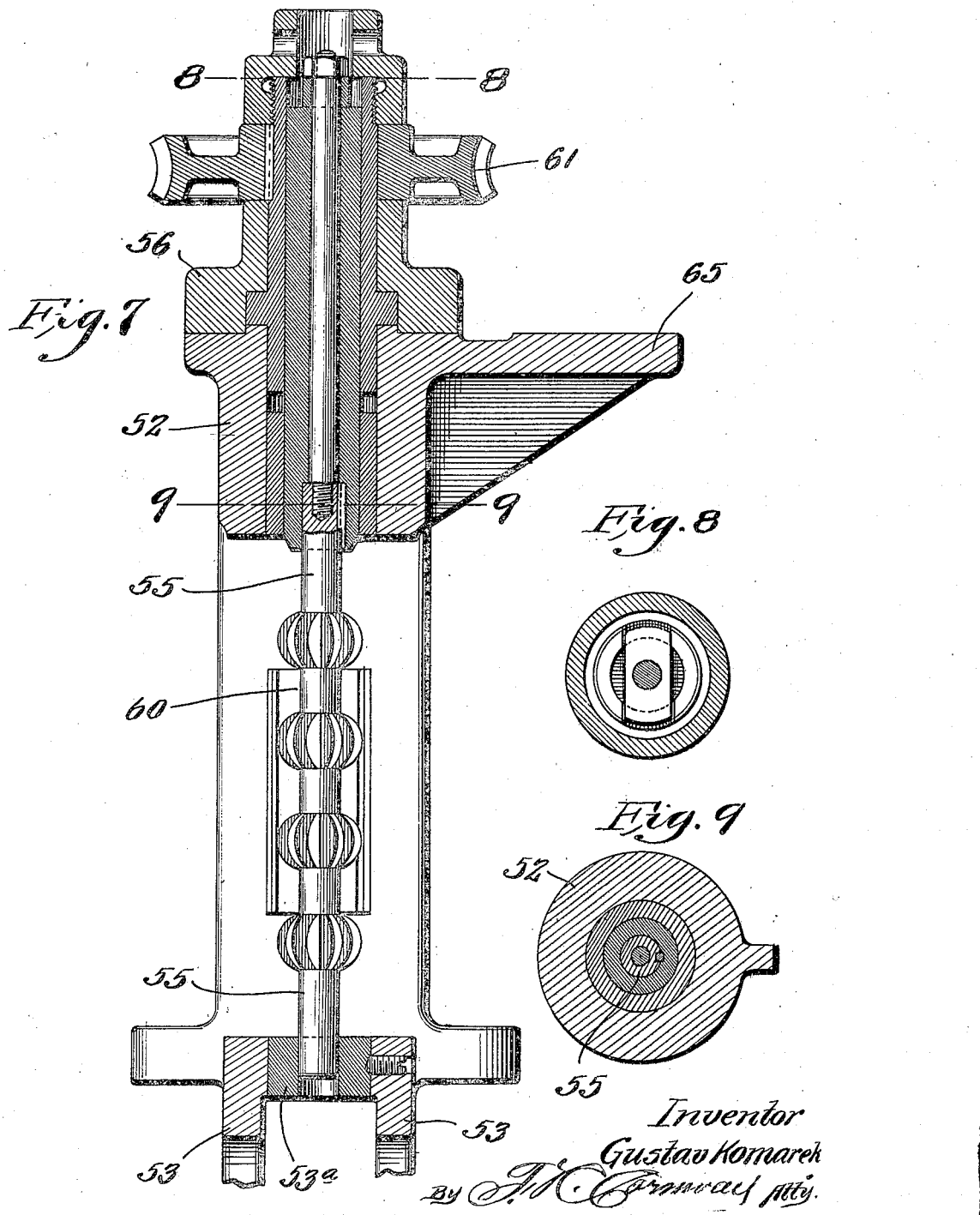

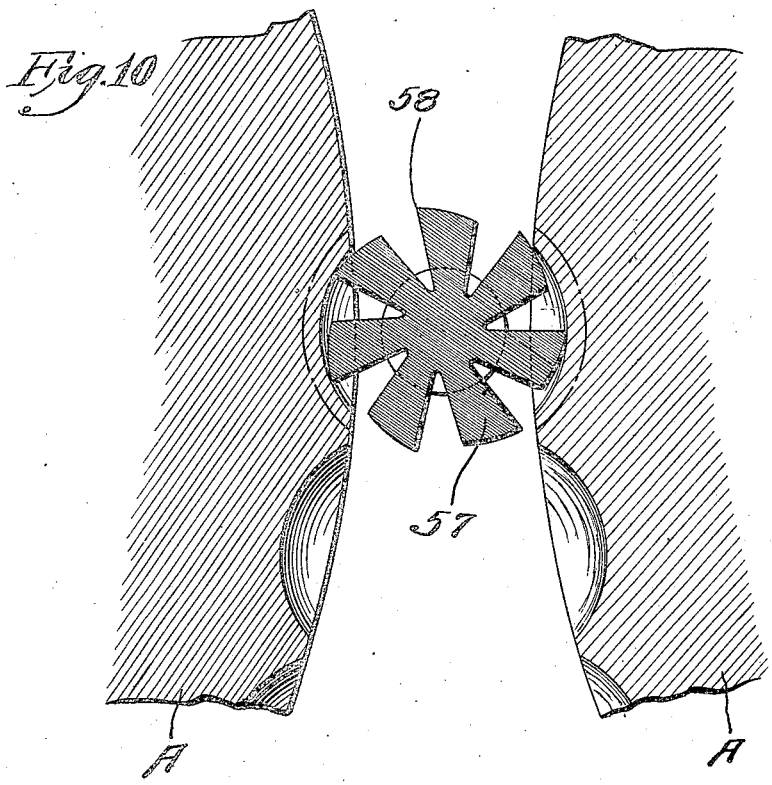
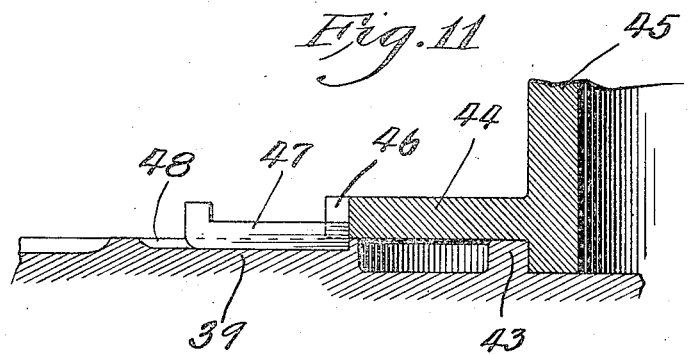

Patented Sept. 26, 1922.

1,430,385

UNITED STATES PATENT OFFICE.

GUSTAV KOMAREK, OF CHICAGO, ILLINOIS, ASSIGNOR, BY MESNE ASSIGNMENTS, TO MALCOLMSON ENGINEERING AND MACHINE CORPORATION, OF ST. LOUIS, MISSOURI, A CORPORATION OF MISSOURI.

MILLING MACHINE.

Application filed May 24, 1920. Serial No. 383,762.

*To all whom it may concern:*

Be it known that I, GUSTAV KOMAREK, a citizen of the United States, residing at Chicago, Illinois, have invented a certain new and useful Improvement in Milling Machines, of which the following is a full, clear, and exact description, such as will enable others skilled in the art to which it appertains to make and use the same, reference being had to the accompanying drawings, forming part of this specification.

My invention relates generally to milling machines and more particularly to a machine that is designed for milling cavities or recesses in the outer faces of metal blocks, and the form of machine herein illustrated and described is specially designed for forming cavities in the peripheral faces of mold rings that are utilized in briquet forming machines.

It will be understood that in briquet presses utilizing pressure rolls having co-operating mold cavities in their peripheral faces, it is essential that the mold cavities be identical in size and form and that the members of each pair of co-operating cavities shall accurately register with each other at the time the highest pressure is being applied to the briqueting material in said co-operating cavities, and it is the principal object of my invention to provide a relatively simple, efficient, and easily operated machine which, in operation, will rapidly and accurately mill in the peripheral surfaces of a pair of mold rings, a series of recesses or mold cavities, and the members of each pair of co-operating cavities being formed with the same cutting tool, thereby insuring uniformity of size, contour and alignment or register of the cooperating cavities.

Further objects of my invention are, to provide a mold ring milling machine which, by reason of its semi-automatic action and the relatively small amount of driving power required can be very economically operated; to provide an improved form of multiple cutter and arrange bearings therefor so that the cutter will at all times be firmly held to operate at a fixed point; to provide improved means for mounting the work upon the machine and feeding the work toward the multiple cutter; and, further, to provide relatively simple means for accurately adjusting and rigidly holding the work upon the machine while the cavities are being milled therein.

With the foregoing and other objects in view, my invention consists in certain novel features of construction and arrangement of parts, hereinafter more fully described and claimed, and illustrated in the accompanying drawings, in which—

Figure 1 is a side elevational view of a milling machine of my improved construction.

Figure 2 is an end elevational view of the machine, said view being taken looking in the direction indicated by the arrow 2, Figure 1.

Figure 3 is an enlarged horizontal section taken approximately on the line 3—3 of Figure 1.

Figure 4 is a vertical section taken approximately on the line 4—4 of Figure 3.

Figure 5 is a cross section taken on the line 5—5 of Figure 3.

Figure 6 is a cross section taken on the line 6—6 of Figure 3.

Figure 7 is an enlarged vertical section taken approximately on the line 7—7 of Figure 5.

Figure 8 is a horizontal section taken on the line 8—8 of Figure 7.

Figure 9 is a horizontal section taken on the line 9—9 of Figure 7.

Figure 10 is an enlarged horizontal section taken on the line 10—10 of Figure 4.

Figure 11 is an enlarged detail section taken approximately on the line 11—11 of Figure 3.

Referring by numerals to the accompanying drawings, which illustrate a practical embodiment of my invention, 10, 10 designate longitudinally disposed rails, preferably I-beams which form the bed or body of the machine, said rails being disposed parallel with each other, connected to each other by suitable transverse rails 11, and supported by suitable base blocks 12. Arranged for rotation in suitable bearings at one end of the frame or body of the machine is a transversely disposed power-driven shaft 13, and fixed on one end thereof are pulleys or belt wheels 14 and 15. Arranged at the opposite end of the machine and mounted for rotation in a rocking bearing 16 is a transversely disposed shaft 17, and which latter is also journaled in a block 18 that is arranged for sliding movement on a vertically disposed rod 19. Loosely connected to this sliding block 18 is the inner end of an arm 20, the outer end of which is seated in a rock shaft 21 that is journaled in a suitable bearing 22, and seated in said rock shaft and projecting outwardly and upwardly therefrom is a hand lever 23.

Fixed to shaft 17 adjacent to the rocking bearing 16 is a pulley 24 and operating thereupon and upon the pulley 15 is a belt 25. Secured to the upper portions of the rails 10 adjacent to their ends are transversely disposed members 26 that are provided at or near their centers with suitable bearings for a longitudinally disposed shaft 27, and fixed thereon is a worm wheel 28 which is adapted to mesh with a worm 29, the latter being carried by the central portion of shaft 17.

Under normal conditions or while the machine is in operation, this worm 29 is in engagement with the worm wheel 28, but by proper manipulation of hand lever 23, shaft 21 may be rocked so as to swing arm 20 downward, thereby moving block 18 a short distance downward on rod 19, which action disengages the worm from said worm wheel. (See dotted lines, Figure 2.)

Journaled in a bracket 30 that projects upwardly from the bed or body of the machine is a short horizontally disposed shaft 31, and fixed thereon is a sprocket wheel 32 and a toothed pinion 33, the latter meshing with the teeth of worm wheel 28. Journaled in the upper portions of the brackets 34 that project upwardly from the bed or body of the machine is a horizontally disposed shaft 35, the outer end of which carries a sprocket wheel 36, and the latter being connected to sprocket wheel 32 by a chain 37. Carried by the inner end of shaft 35 is a hand wheel 38.

The construction just described provides means for manually rotating shaft 27, the purpose of which will be hereinafter more fully set forth.

Arranged to slide lengthwise on top of the central portions of rails 10 are bed plates 39 that are adapted to carry the mold rings during the milling operations, and to retain these bed plates in proper position during their sliding movements, they are provided on their undersides with depending longitudinally disposed flanges 40 which bear directly against the inwardly presented top flanges of the rails 10, and removably secured to the lower portions of these flanges are retaining rails or plates 41 which underlie the inner edges of the flanges of said rails 10. (See Fig. 6.)

The upper faces of the bed plates 39 may be formed so as to accommodate the character of work being done on my improved machine, but where the machine is used for milling mold cavities in the peripheries of mold rings, such, for instance, as are illustrated in Figures 1 and 4, the upper faces of the bed plates are provided with annular index ring receiving faces 42, the same being smooth and flat.

Concentrically disposed within each of these annular faces is an upstanding annular flange 43. Adapted to rest on the inner edge of each face 42 and on top of the corresponding flange 43 is an index plate or ring 44 with which is formed integral an annular flange or hub 45, the lower portion of the latter being of such size as to fit snugly within the annular flange 43. Formed in the edge of the plate or ring 44 is a series of notches 46, the same serving as guides or indexes for the cavities that are to be formed in the mold rings.

For the purpose of locking each index ring to the bed plate, I employ a key such as 47, the latter being removably positioned in either one of a pair of radially disposed grooves 48 that are formed in the finished face 42 of each bed plate and the inner end of said key being adapted to enter any one of the notches 46. (See Fig. 11.)

For the purpose of feeding the bed plates and the work carried thereby toward and away from each other, shaft 27 is provided with right and lefthand threaded portions 49 and 50 and arranged upon these threaded portions are nuts or blocks 51, the upper portions of which are interlocked in any suitable manner with the bed plates 39.

Rigidly fixed in any suitable manner to the tops of rails 10 and between the bed plates 39 is an upright frame or bracket 52 which carries the bearings for the tool or multiple cutter forming a part of my invention, and formed in the lower portion of this frame and at a central point between the rails 10 is a housing 53 through which passes the central portion of shaft 27.

In order to provide a stable bearing for the central portion of this shaft 27, a suitable collar $53^a$ is fixed to said shaft and said collar occupying the housing 53. Located in the upper portion of housing 53 is a bearing 54 for the lower end of the shaft 55 of the multiple cutter or milling tool, and the upper end of this shaft is journaled for rotation in a suitable bearing 56 that is formed in the upper portion of frame 52.

Formed integral with or fixed to the shaft 55 is a series of cutting heads each comprising a plurality of radially disposed blades 57. The outer forward edges 58 of these blades perform the cutting operations in the mold rings or other work positioned on the machine and while said edges may be of any desired contour, they are necessarily curved lengthwise where ordinary rounded or curved mold cavities are formed, and which latter are usually provided in the peripheries of mold rings utilized for forming fuel briquettes.

In order to permit the mold rings to be moved relatively close to each other, thereby enabling the milling tool or cutter to form relatively deep mold cavities in the peripheries of said rings, the side faces of the central portion of frame 52 are recessed or curved inwardly, as illustrated in Figure 3, and to provide firm and substantial bearings for the central portion of the shaft 55 of the cutting tool, bearing plates 59 are secured to frame 52 to the sides of the cutter or milling tool and said plates being provided with projecting portions 60 which pass between the cuttings heads and bear directly upon the shaft 55 between said heads. The width of these portions 60 is slightly less than the diameter of the shaft of the milling tool and thus the work or mold rings in which the cavities are being formed can be moved toward each other until their peripheries practically contact with the shaft of the tool and consequently permitting the cutting heads to cut their entire depth into said mold rings. The projections 60 form bearings which firmly support the shaft of the milling tool or cutter between the cutting heads and prevent lateral deflection of said shaft in all directions while in operation.

The upper end of the shaft 55 of the milling tool within bearing 56 is connected in any suitable manner to a horizontally disposed worm wheel 61, and the latter engages a worm 62 that is carried by a horizontally disposed shaft 63. This worm wheel is partially enclosed in a suitable housing 64, and said shaft operates in suitable bearings 65 that are carried by the upper end of transverse frame 52. Fixed on the outer end of shaft 63 is a pulley 66 and operating thereupon and upon the pulley 14 is a belt 67.

When my improved machine is utilized for milling pockets or cavities in mold rings of the type illustrated in Figures 1 and 4, the bed plates 39 are moved away from the milling tool and from each other a sufficient distance to enable workmen to place the mold rings on the bed plates, such operations being facilitated by the use of a crane or derrick.

To move the bed plates away from each other or into positions to readily receive the mold rings, hand lever 23 is swung upward and inward or into the position shown by dotted lines, Figure 2, which action rocks shaft 21 and swings the inner end of arm 20 and bearing block downward, thereby disengaging the worm 29 from worm wheel 28. An operator now manipulates hand wheel 38 to rotate shaft 35 and through the connections 36, 37 and 32, shaft 31 is rotated and the motion thereof will be transmitted to shaft 27 through pinion 33 and worm wheel 28. As shaft 27 is thus rotated, the nuts or blocks 51 operating upon the right and lefthand threaded portions 49 and 50 of said shaft and engaging the bed plates 39 will move the latter away from each other and away from the vertically disposed milling tool.

The mold rings A are now fitted onto the index rings 44 with the hubs or flanges 45 of the latter projecting upwardly into the openings in said rings and the mold rings are locked to the index plates in any suitable manner, preferably by means of keys such as B that enter suitable key-ways that are formed in the inner faces of the mold rings, and the outer faces of the flanges or hubs 45.

The index rings are now locked to the bed plates by means of keys 47 inserted in certain of the grooves 48 and recesses 46, as illustrated in Figure 11, after which the hand wheel 38 is properly manipulated to rotate shaft 27 in the proper direction and effect a movement of the bed plates carrying the mold rings toward each other and toward the milling tool. When, as a result of this operation, the peripheries of the mold rings have been brought into positions immediately adjacent to the cutting heads of the milling tool, hand lever 23 is pulled outward, thereby elevating bearing block 18 and effecting an engagement between worm 29 and worm wheel 28. Power is now applied to shaft 13 and the rotary motion thereof will be transmitted through belt 25 and pulley 24 to shaft 17 and the worm carried by the latter will transmit rotary motion through worm wheel 28 to shaft 27, and as the latter rotates, the nuts or blocks 51 operating on the right and lefthand threaded portions of said shaft will move the bed plates and the mold rings carried thereby slowly toward each other and toward the milling tool. As shaft 13 is driven, rotary motion will be transmitted through belt 67 and pulley 66 to shaft 63, and worm 62 on the latter engaging worm wheel 61 will impart rotary motion to the milling tool.

As the operation continues, the cutting edges 58 of the blades 57 forming the cutting heads of the tool will engage and cut into the peripheral surfaces of the mold rings A as the latter are slowly moved toward the tool, and as a result, a plurality of mold cavities which are uniform in size and shape will be formed in said mold rings. (See Fig. 10).

One of the particularly desirable features of my invention is the cutting of both members of a pair of cooperating mold cavities with the same cutting heads and in this connection it will be understood that the mold rings when placed on their shafts in the briquet press occupy the same relative positions as they did upon the milling machine, and which result is due to the relative positions of the key-ways in said mold rings and which receive the locking keys B.

Inasmuch as the side faces of frame 52 are recessed as illustrated in Figure 3, the peripheral portions of the mold rings are permitted to move inward so that the cutting heads can operate to their full depth in forming the mold cavities, and this action is also made possible due to the fact that the width of the bearings 60 which engage the shaft of the milling tool between the cutter heads, is less than the diameter of said shaft.

At the completion of the milling operations or when the mold cavities have been cut to the proper depth, the operator or attendant actuates hand lever 23 to effect a disengagement between worm 29 and worm wheel 28, and as the shaft 27 ceases to rotate, the bed plates and mold rings carried thereby will cease their movements toward each other and toward the milling tool. The operator now manually operates hand wheel 38 to move the bed plates and carried mold rings away from each other as hereinbefore described and after the keys 47 have been disengaged from grooves 48 and recesses 46 the index rings 44 and mold rings A carried thereby are rotated the distance between two adjacent notches 46, and the keys 47 are now reseated to lock the index rings to the bed plates and the parts are ready for a succeeding operation.

It will be understood that the distance between the notches 46 represents the distance between the vertical rows of mold cavities formed in the rings A and by proper angular arangement of the members of each pair of grooves 48 with respect to each other, it is possible to adjust the mold rings so as to provide a staggered arrangement of the cavities in the mold rings, as illustrated by dotted lines X, Figure 1, but obviously when this is done, the position of the milling tool must be elevated or lowered as the case may be or a second milling tool must be employed.

A mold ring milling machine of my improved construction is comparatively simple, can be operated with comparatively little power, is very accurate in the formation of the cavities in the mold rings, and is very efficient in performing its intended functions.

It will be readily understood that minor changes in the size, form and construction of the various parts of my improved mold ring milling machine can be made and substituted for those herein shown and described, without departing from the spirit of my invention, the scope of which is set forth in the appended claims.

I claim as my invention:

1. In a mold ring milling machine, a multiple cutter, means for indexing the mold rings and locking them angularly, and work supporting members arranged to move simultaneously toward said multiple cutter.

2. In a mold ring milling machine, a multiple cutter, work holding members arranged on opposite sides of said cutter and adapted to move toward and away from the cutter, and mechanism for automatically rotating said cutter and moving said members toward said cutter.

3. In a mold ring milling machine, a cutting tool comprising a shaft, and a plurality of spaced cutting heads carried by said shaft, each of which heads comprises a plurality of radially disposed blades having curved cutting edges and mechanism for automatically feeding the rings to opposite sides of all of said heads simultaneously.

4. In a mold ring milling machine, a cutting tool comprising a shaft, a plurality of cutting heads carried thereby, each head comprising a plurality of radially disposed blades, and bearings for said shaft between said cutter heads.

5. In a mold ring milling machine, a cutting tool comprising a shaft, a plurality of cutting heads carried thereby, each head comprising a plurality of radially disposed blades, bearings for the ends of said shaft, and bearings for said shaft between said cutter heads.

6. In a mold ring milling machine, a pair of rotatable work holding members arranged for movement toward and away from each other, a multiple cutting tool arranged for operation between said members and adapted to engage the peripheral surfaces of the work carried by said members as the latter move toward each other, and means for obtaining identical rotation of said members.

7. In a mold ring milling machine, a pair of work holding members arranged for movement toward and away from each other, a multiple cutting tool arranged for operation between said members and adapted to engage the peripheral surfaces of the work carried by said members as the latter move toward each other, means for simultaneously operating the multiple cutter and moving the work holding members toward said cutter, and means for indexing said members to present different points of the rings to said cutter.

8. In a mold ring milling machine, a pair of bed plates arranged to move toward and away from each other, index rings adjustably carried by said bed plates and adapted to receive the work to be milled, and a multiple cutter arranged for operation between said bed plates.

9. In a mold ring milling machine, a pair of bed plates arranged to move toward and away from each other, index rings adjustably carried by said bed plates and adapted to receive the work to be milled, a multiple cutter arranged for operation between said bed plates, and means for simultaneously moving said bed plates toward each other.

10. In a mold ring milling machine, a pair of bed plates mounted for movement toward and away from each other, means for imparting simultaneous movement to said bed plates, index rings adjustably carried by said bed plates and which index rings are adapted to receive mold rings, and a milling tool arranged for operation between said bed plates.

11. In a mold ring milling machine, a pair of bed plates mounted for movement toward and away from each other, means for imparting simultaneous movement to said bed plates, index rings adjustably carried by said bed plates and which index rings are adapted to receive mold rings, a milling tool arranged for operation between said bed plates, and means for simultaneously operating said milling tool and the bed plate actuating means.

12. In a mold ring milling machine, a pair of members adapted to receive and retain mold rings, means for simultaneously moving said members toward each other, and means for simultaneously forming mold cavities in the peripheries of the mold rings as the same are moved toward each other.

13. In a mold ring milling machine, a pair of bed plates arranged to move toward and away from each other, power operated means for moving said members toward each other, adjustable members carried by said bed plates and adapted to receive and retain mold rings, and means for simultaneously forming a plurality of mold cavities in the peripheries of the mold rings as the same are carried toward each other upon the bed plates.

14. In a mold ring milling machine, a frame, a pair of bed plates arranged for movement toward and away from each other upon said frame, work receiving index rings adjustably carried by said bed plates, means for locking said index rings to said bed plates, and a milling tool arranged for operation between said bed plates.

15. In a mold ring milling machine, a frame, a pair of bed plates arranged for movement toward and away from each other upon said frame, work receiving index rings adjustably carried by said bed plates, means for locking said index rings to said bed plates, a milling tool arranged for operation between said bed plates, means for simultaneously moving the bed plates toward each other, and means for operating said milling tool.

16. In a mold ring milling machine, a cutting tool, ring supports on different sides of said tool adapted to be turned to present different parts of the ring to said tool, and means for obtaining the same degree of turning of said supports so that molds milled in the ring on one support will be the same distance apart as molds milled in the ring on the other support.

17. In a mold ring milling machine, a cutting tool, ring supports on different sides of said tool adapted to be turned to present different parts of the ring to said tool, and means for securing identical turning of said supports, comprising peripheral notches in said supports and notch-engaging elements having fixed positions angularly of said tool.

18. In a mold ring milling machine, a rigid supporting frame, a cutting tool, work holders rotatably mounted on said frame and located on opposite sides of said tool, radial slots in said holders, slots in said frame, and keys for aligning any one of the slots in said holders with a slot in said frame.

In testimony whereof I hereunto affix my signature this 19th day of May, 1920.

GUSTAV KOMAREK.